(12) United States Patent
Rosenfeldt et al.

(10) Patent No.: US 10,508,577 B2
(45) Date of Patent: Dec. 17, 2019

(54) LINE CONNECTOR WITH INTEGRATED SENSOR FOR MEASUREMENT OF UREA SOLUTIONS

(71) Applicant: VOSS AUTOMOTIVE GMBH, Wipperfürth (DE)

(72) Inventors: Sascha Rosenfeldt, Wipperfürth (DE); Christian Zwillus, Bergneustadt (DE); Waldemar Wilms, Marienheide (DE)

(73) Assignee: VOSS Automotive GmbH, Wipperfurth (DE)

( * ) Notice: Subject to any disclaimer, the term of this patent is extended or adjusted under 35 U.S.C. 154(b) by 72 days.

(21) Appl. No.: 15/822,518

(22) Filed: Nov. 27, 2017

(65) Prior Publication Data
US 2019/0162093 A1    May 30, 2019

(51) Int. Cl.
*F01N 3/20* (2006.01)
*G01L 19/00* (2006.01)
(Continued)

(52) U.S. Cl.
CPC ............ *F01N 3/208* (2013.01); *F01N 3/2066* (2013.01); *F01N 13/0097* (2014.06); *F16L 25/01* (2013.01); *F16L 53/38* (2018.01); *G01L 19/0023* (2013.01); *H01R 13/005* (2013.01); *H05B 3/42* (2013.01); *H05B 3/56* (2013.01); *F01N 2450/00* (2013.01); *F01N 2610/02* (2013.01); *F01N 2610/10* (2013.01);
(Continued)

(58) Field of Classification Search
CPC .......... F01N 13/0097; F01N 2610/142; F01N 2900/1814; F01N 2900/1811; F01N 2610/146; F01N 2610/02; F01N 2610/10; F01N 3/2066; F01N 3/208; F01N 2450/00; F01N 2610/14; F16L 53/38; F16L 25/01; H01R 13/005; H05B 3/56; H05B 3/42; G01L 19/0023
See application file for complete search history.

(56) References Cited

U.S. PATENT DOCUMENTS

| | | | |
|---|---|---|---|
| 9,388,932 B2 | 7/2016 | Ristovski et al. | |
| 2011/0061444 A1* | 3/2011 | Suzuki | B23K 35/30 73/25.01 |

(Continued)

FOREIGN PATENT DOCUMENTS

EP    2137449 B1    6/2011

*Primary Examiner* — Brandon D Lee
(74) *Attorney, Agent, or Firm* — Eric J. Sosenko; Jonathan O. O'Brien; Honigman LLP

(57) ABSTRACT

A line connector for a fluid, in particular a urea solution, including a connecting piece with an interior flow-through channel extending in the longitudinal direction of the connecting piece. The connecting piece includes at each of its two ends a coupling section designed such that a flexible media line or a tubing or an aggregate can be connected to an aggregate connector. The flow-through channel is also provided with an electrical heating unit. In the region of the flow-through channel, between the connecting sections, an enclosed perimeter receiving housing is formed on the coupling piece, in which an optical sensor unit is disposed for measuring of properties of the fluid flowing in the flow-through channel. A ready-made media line, including a tubular or hose-like media line and a line connector connected on one or both sides to this media line is also disclosed.

21 Claims, 5 Drawing Sheets

(51) Int. Cl.
*F01N 13/00* (2010.01)
*F16L 53/38* (2018.01)
*F16L 25/01* (2006.01)
*H01R 13/00* (2006.01)
*H05B 3/56* (2006.01)
*H05B 3/42* (2006.01)

(52) U.S. Cl.
CPC .... *F01N 2610/14* (2013.01); *F01N 2610/142* (2013.01); *F01N 2610/146* (2013.01); *F01N 2900/1811* (2013.01); *F01N 2900/1814* (2013.01)

(56) References Cited

U.S. PATENT DOCUMENTS

| | | | |
|---|---|---|---|
| 2013/0220467 A1* | 8/2013 | Ristovski | F16L 55/00 138/104 |
| 2014/0226149 A1* | 8/2014 | Coates | G01F 23/292 356/51 |

* cited by examiner

LINE CONNECTOR WITH INTEGRATED SENSOR FOR MEASUREMENT OF UREA SOLUTIONS

BACKGROUND

1. Field of the Invention

The present invention relates to a line connector, comprising a connecting piece with a flow-through channel for a urea solution in the interior thereof and extending in the longitudinal direction of the connecting piece, wherein the connecting piece features at each of its two ends a coupling section which is designed such that a flexible media line or a tubing or an aggregate can be connected to an aggregate connector, and the flow-through channel is provided with an electrical heating unit.

2. Description of Related Technology

A line connector of this kind is known, for example, from EP 2 137 449 B1.

According to current emissions requirements, a device known as an SCR-system is usually required for treatment of exhaust from diesel vehicles. In this regard, toxic nitrogen oxides are converted into harmless nitrogen and oxygen by the injection of a urea solution in the region of an SCR catalyst.

The medium, the urea solution, is drawn from a separate tank via lines and connectors to a dosing unit for injection of the urea solution into the exhaust system. The quality and the proper mixing ratio of the urea solution are monitored to satisfy the particular legal requirements. This is assured by a urea quality sensor.

The quality sensor today usually is seated in a tank to hold the urea solution. It is either immersed in the medium there, or is seated in the tank wall. Immersed sensors are secured to a tank header unit (header unit) which also effects a thawing of the urea solution in the tank. Sensors seated in the tank wall are secured in place on the tank by means of a device. A suitable gasket prevents the leakage of urea solution from the tank.

Various methods are known for electronically measuring the quality of the urea solution. One known technique, for example, is the measurement of ultrasound wave transit times by means of an ultrasonic sensor. In addition, thermal or optical sensor systems are used.

Especially in commercial vehicles or off-road vehicles, the known measuring systems have the disadvantage that there are numerous, different tank geometries for the tank to hold the urea solutions, wherein for each tank the position of the sensor in or on the tank has to be determined anew. This produces a greater number of variants.

Pollutants appear in the tank holding the urea solution, especially in commercial and off-road vehicles; these pollutants can move through the tank opening into the tank and can adversely affect the measurement of the quality of the urea solution.

In addition, during fueling, a large number of air bubbles can be carried into the tank. Small bubbles can settle and/or adhere to the surface of the sensor. These bubbles in the urea solution or on the surface of the sensor adversely impact the specific measurement.

Since the tank contains a not inconsiderable quantity of urea solution at temperatures below the freezing point, larger chunks of ice can form within the tank solution, which likewise negatively affect the measurement and can also damage the sensors by mechanically sloshing back and forth in the solution.

Measurement sensors seated in the tank wall can result in the loss of a large volume of urea solutions, if they experience a leak. Furthermore, measurement sensors immersed in the tank are fully surrounded by the urea solution. Thus all electrical connections also have to be introduced into the tank housing. In addition, they must be protected against penetration of the urea solution. Any penetration of the urea solution can result in destruction of the particular measurement sensor. Furthermore, the urea solution can also creep into the cable tree of the connected electrical cables and cause additional destruction in the vehicle.

In case of needed service to replace the measurement sensor, the entire tank will have to be drained of the urea solution, if the measurement sensors are seated in the tank wall. In the case of measurement sensors seated in the tank header, it will have to be fully disassembled, which is associated with significant effort and expense.

The object of the present invention is to design an installation possibility for a measurement sensor to measure properties of the urea solution, which avoids the above disadvantages and is distinguished by a compact and low-cost assembly.

SUMMARY

This problem is solved by means of a line connector with the features of claim 1. The invention is based on the knowledge that the measurement of the properties of the urea solution flowing in the flow-through channel takes place directly in the flow-through channel itself, so that thus the measurement sensor is itself a constituent of the line connector. Thus the installation of the measurement sensor is independent of the particular tank geometry; likewise the tank geometry can be selected independently of the installation of this kind of measurement sensor. Due to the integration of the measurement sensor into the line connector pollutants, which may be present in the tank, are no longer relevant to the measurement, because such pollutants generally are kept away from the line system itself by a filter. In addition, the problem of air bubbles adversely affecting the measurement result, because such air bubbles are introduced during filling of the tank, is eliminated because they are not present in the line system, since no air bubbles can settle permanently onto the surface of the sensor during the flow of the media during operation. Also, any ice chunks possibly present in a tank cannot affect the line system itself. If a leak occurs, any leakage of a large volume of the urea solution need not be feared, since only a small amount of urea solution is ever present in the line system itself. Accordingly, any leaking urea solution cannot cause significant damage. Likewise, any leakage cannot result in significant destruction of other components of the vehicle, since the electrical connections are not immersed in the urea solution itself. If service is needed, the particular line or sensor can be easily replaced together with or separate from the line connector. In addition, the sensor is easier to reach, and no additional precaution is needed, such as drainage of the tank, for example.

According to the invention, it is an advantage that in the region of the flow-through channel, between the coupling sections provided at the two ends, a wall section permeable to an optical sensor signal is formed in a wall of the coupling piece surrounding the flow-through channel, and a receiving housing surrounding the perimeter of the permeable wall section is formed on the coupling piece and features a receiving opening positioned opposite the permeable wall section for mounting an optical sensor unit inside of the receiving housing. Thus according to the invention the measurement takes place at the surface of the medium in the flow region of the line system. The measurement area of the sensor and/or its measurement surface is thus a part of the medium channel. Therefore, a separate medium channel which leads to the sensor and which would then lead away from it is unneeded. Furthermore no opening to the sensor itself is present, so that the urea solution could penetrate into the sensor itself. According to the invention, the optical sensor emits light in the IR range through the permeable wall section into the medium. In this case the light is reflected from the surface of the urea solution and is directed back to the sensor by the surface permeable to the sensor signal or by the permeable wall section. The angle of reflection and the intensity of the reflected light are an indication of the quality of the urea solution. It is advantageous to design the permeable wall section as an open wall aperture. In this case it is an advantage, if the sensor unit features a covering on its side opposite the aperture, such that the covering seals the open aperture and itself consists of a material permeable to the optical sensor signal. By means of this inventive configuration, the sensor unit forms a part of the wall of the flow-through channel. Thus the flow-through channel of the connecting piece is bounded by this covering in the region of the aperture. Thus an important manufacturing advantage is attained by the line connector according to the invention, since the line connector can be made of a consistent material as an integral plastics injection molded part. According to the invention, direct contact of the urea solution with the sensor is prevented.

The advantageous sensor according to the invention is a component part of an enclosed sensor body, so that the sensor located within the sensor body is itself shielded against the present urea solution. According to the invention, it is an advantage if the sensor body which contains the measurement sensor is sealed by an O-ring gasket from the receiving housing of the line connector. This design of the gasket is distinguished by a simple structure and ensures a sealing to the outside, so that the present urea solution cannot leak to the outside.

One functional embodiment of an attachment of the sensor body to the receiving housing of the line connector can be implemented, for example, by a permanent bond, for example, by means of laser welding, wherein this laser welding can be designed as non-circumferential and also not for sealing of the sensor body against the receiving housing. It is used only for holding the sensor body in the receiving housing. As an alternative to the welding of the sensor body to the receiving housing, a mechanical joining between these two parts can be used and specifically, for example, by means of a bayonet-like joint. A clip-like snap-in locking of the two parts would also be advantageous, wherein a detachable and a non-detachable clip joint in the form of a snap-in can be expedient.

Advantageous designs of the invention are found in the dependent claims. The individual features of the dependent claims can be combined individually or in other combination with the features of the main claim.

According to the invention therefore, a high-precision quality control of the urea solution is possible directly in the flow-through channel, wherein at temperatures between −8° C. and +50° C., the smallest deviations in the concentration of urea solution in the range of +/−2% can be detected at concentrations between 20% and 40%, and deviations of +/−3% at concentrations between 10% and 20%.

According to the invention, the inventive line connector can be integrated into a heated or into a not heated media line, so that an intelligently composed line is created for transmittal of urea solutions, wherein because the line connector can be heated and owing to the connected media line, an accurate and defined operating performance is assured.

BRIEF DESCRIPTION OF THE DRAWINGS

Favorable embodiments of the invention and the invention itself are explained in greater detail below, based on the included figures and illustrated exemplary embodiments. The figures depict.

DETAILED DESCRIPTION

The same parts in the various figures of the illustrations are always provided with the same reference numbers.

With regard to the following specification, the invention is not restricted to the exemplary embodiments and thus not to all or several features of described feature combinations, rather each individual part feature of the/of each exemplary embodiment is also of significance for the subject matter of the invention, even when detached from all other part features described in connection with it, and also in combination with features of any other exemplary embodiment.

Figure 8:
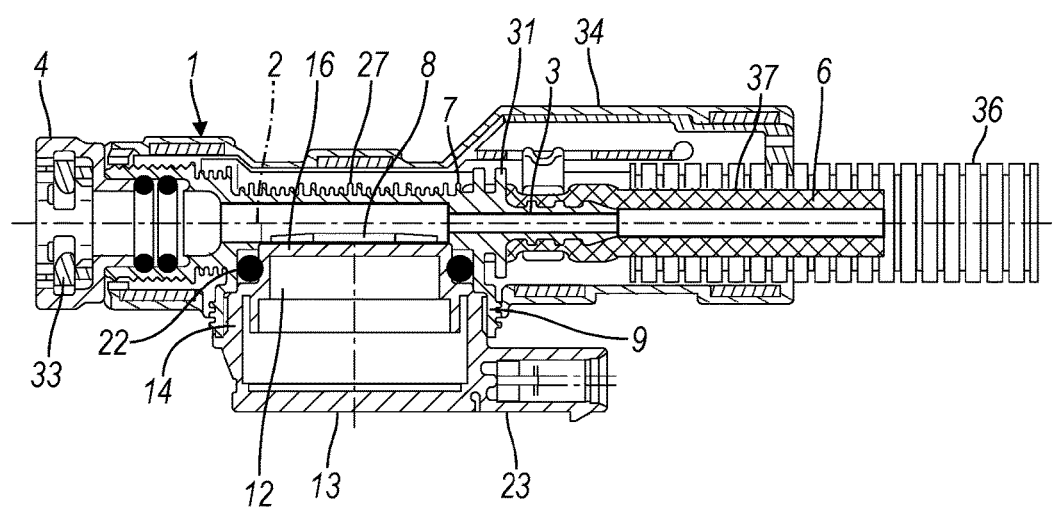
FIG. 8 is a cross section through a line connector according to the invention, with connected media line and external housing.

As is indicated, for example in FIGS. 1 to 6, a line connector according to the invention comprises a connecting piece 1 with a flow-through channel 2 for a fluid, in particular a urea solution in the interior thereof and extending in the longitudinal direction of the connecting piece 1, wherein the connecting piece 1 features at each of its two ends a coupling section 3, 4 which is designed such that a flexible media line 6, see FIG. 8, or a tubing or an aggregate can be connected to an aggregate connector. According to the invention, the flow-through channel 2 is provided with, or can be heated by, an electrical heating unit 7.

Figure 5:
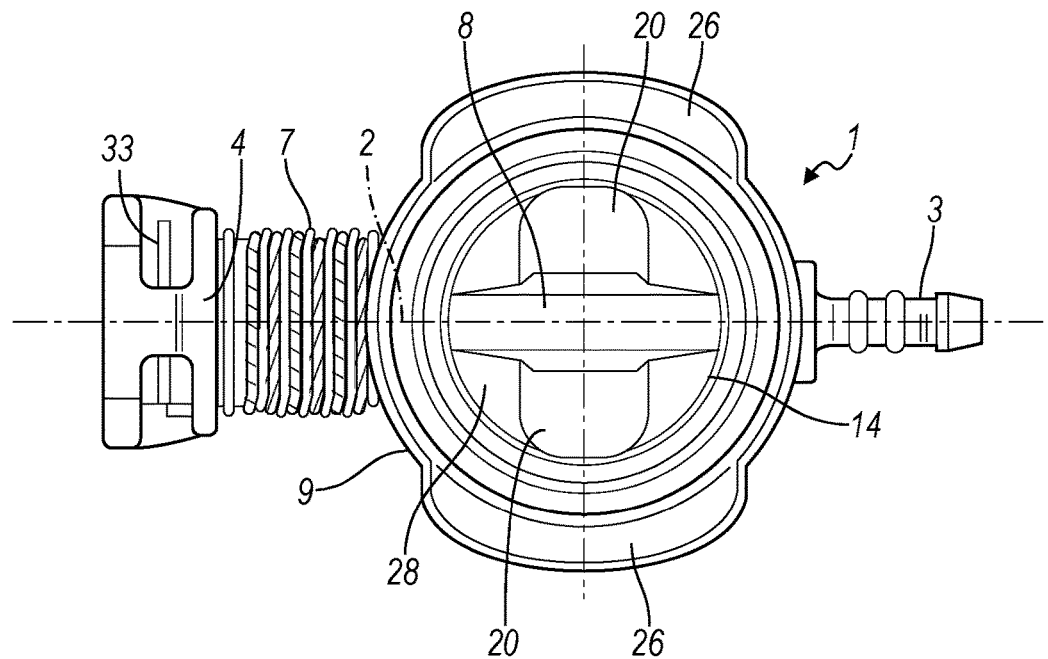
FIG. 5 is a bottom view of the line connector seen in FIG. 1.
Figure 6:
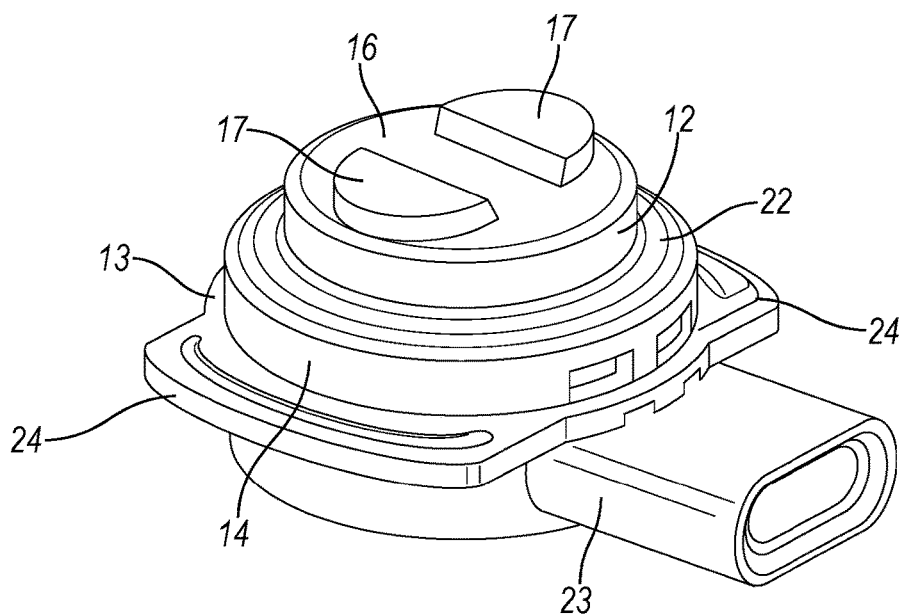
FIG. 6 is a perspective view of a sensor unit according to the invention.

In the region of the flow-through channel 2 between the two coupling sections 3, 4 provided at each of the ends of the flow-through channel 2, there is a wall section permeable to an optical sensor signal located in a wall of the connecting piece 1 surrounding the flow-through channel 2, said wall section is produced as an aperture 8, as is depicted preferably in FIG. 5. A receiving housing 9 surrounds the perimeter of the wall section, in particular the aperture 8, which is permeable to an optical sensor signal; the housing is formed on the connecting piece 1. This receiving housing 9 features a receiving opening 11 located opposite the aperture 8, through which an optical sensor unit 12 can be installed. An optical sensor unit 12 of this kind is depicted in FIG. 6, for example. An optical sensor unit 12 of this kind is used to measure the quality of the urea solution flowing in the line connector.

Preferably the connecting piece 1 including the two coupling sections 3, 4 and the receiving housing 9 are designed as a single piece, integral injection molded plastic part. In this case a plastic is used which is suitable for transporting of urea solutions in the SCR method. The optical sensor unit 12 is expediently installed in a sealing lid 13 for the receiving opening 11, wherein the sealing lid 13 is preferably detachably or non-detachably joined to the receiving housing 9 in its sealed position sealing the receiving opening 11. Preferably the detachable sealed position of the sealing lid 13 is produced by means of a bayonet-like connection. The non-detachable sealed position is formed in particular by a material-bonded, or permanently bonded connection, in particular by a laser welded bond. The sealing lid 13 features preferably an assembly space surrounded by a perimeter wall 14; the optical sensor unit 12 is or can be mounted in this assembly space. The height of the perimeter wall 14 is preferably dimensioned such that the sealing lid 13 in its sealed position with the perimeter wall 14 passes through the receiving opening 11 into the receiving housing 9.

The assembly space of the sealing lid 13 formed by the perimeter wall 14 is preferably equipped with a covering 16 which is optically permeable to optical signals of the optical sensor unit 12. The covering 16 is hereby preferably designed such that it seals the open aperture 8 in the wall 7 of the flow-through channel 2 so that one wall section of the covering 16 bounds the flow-through channel 2 of the connecting piece 1.

Figure 11:
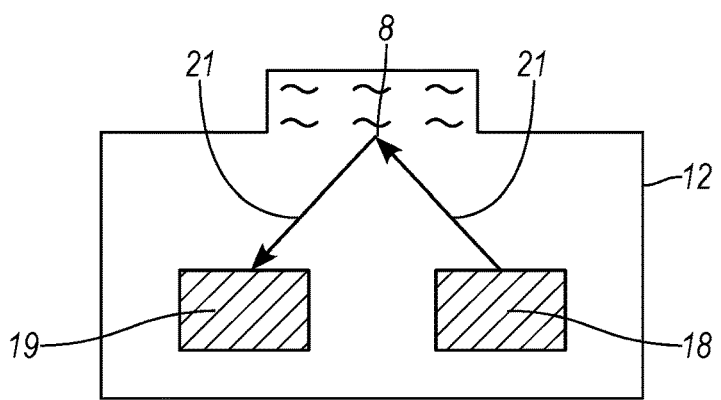
FIG. 11 is a depiction of the measuring principle according to the invention.

Furthermore, it is advantageous, if the covering 16 of the sealing lid 13 features mutually opposing protrusions 17 on both sides of its wall section used to delimit the flow-through channel 2, and each protrusion having a cavity in its interior. An advantageous optical sensor which is arranged within the sensor unit 12, as depicted schematically in FIG. 11, features an emitter 18 and an optical receiver 19. The two protrusions 17 act firstly, to accommodate an emitter 18 and secondly, to accommodate a receiver 19. The emitter 18 and the receiver 19 are arranged such that an optical beam path 21, as depicted in FIG. 11, is guided through the aperture 8 to the urea solution flowing in the flow-through channel 2, and from there is guided by reflection to the receiver 19, if the sensor unit 12 is completely installed in the receiving housing 9.

Furthermore, it is advantageous to provide a depression 20 in one bottom section 28 of the receiving housing 9 on both sides of the permeable wall section, especially of the aperture 8, to accommodate one of the protrusions 17 to accommodate the emitter 18 and/or the receiver 19. Thus both a secure covering of the aperture 8, and also an unhindered irradiation of the optical signal 21 onto the fluid flowing in the flow-through channel 2 is assured.

As is illustrated in particular in FIG. 6, a recess is formed at the free end of the perimeter wall 14, for example, on which a perimeter gasket 22 is seated and which is designed preferably as an elastically deformable O-ring gasket.

The perimeter gasket 22 ensures a fluid-tight sealing between the sealing lid 13 and the receiving housing 9 in the sealed position of the lid 13. A coupling region 23 is formed on the optical sensor unit 12 which is used for connection of an electrical power supply to the sensor arranged within the sensor unit 12.

At the outer perimeter of its perimeter wall 14, the sensor unit 12 features preferably web-like extensions 24 directed perpendicular to said perimeter wall; the protrusions have preferably an arc-like shape and are positioned diametrically opposite each other. Preferably the receiving housing 9 in the plugged-in state of the sensor unit 12 has arc-like, web-shaped extensions 26 positioned opposite the web-shaped extensions 24 of the sensor unit 12. In the region of these web-shaped extensions 24, 26 of the sensor unit 12 and of the receiving housing 9, the sensor unit 12 in the assembled state can be bonded to the receiving housing 9, as already explained, either by a permanent bond or interlocking bond.

Figure 1:
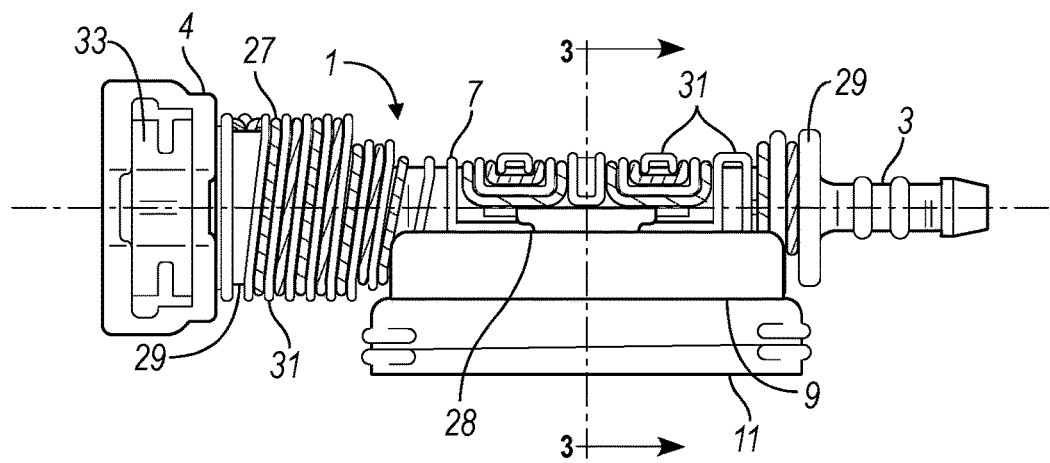
FIG. 1 is a side view of a line connector according to the invention.
Figure 2:
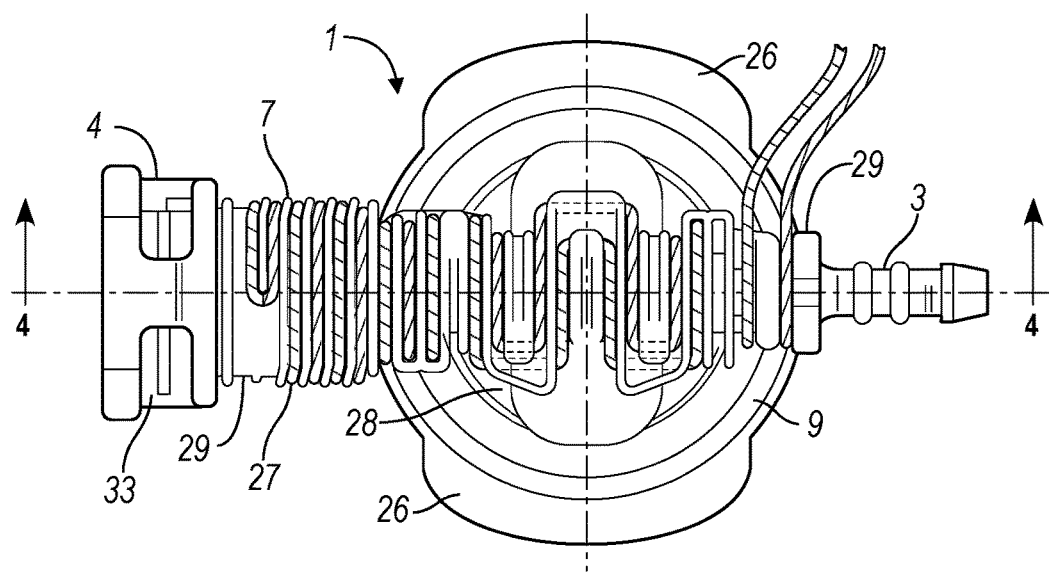
FIG. 2 is a top view of the line connector seen in FIG. 1.
Figure 3:
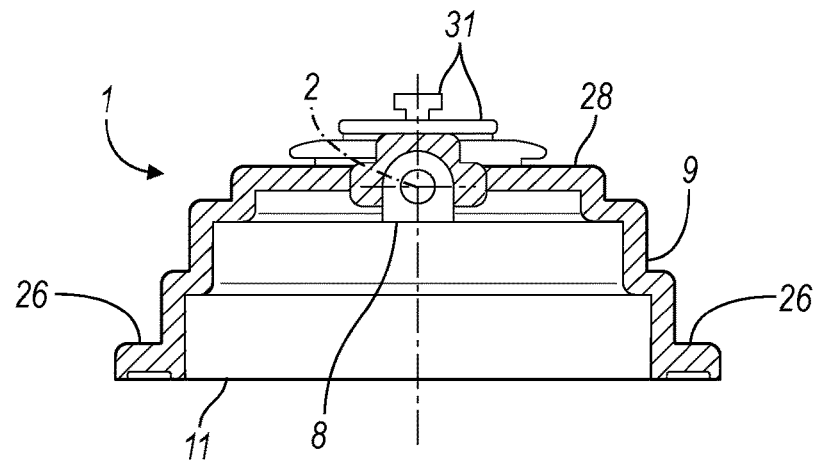
FIG. 3 is a cross-section along cut line 3-3 in FIG. 1.
Figure 4:
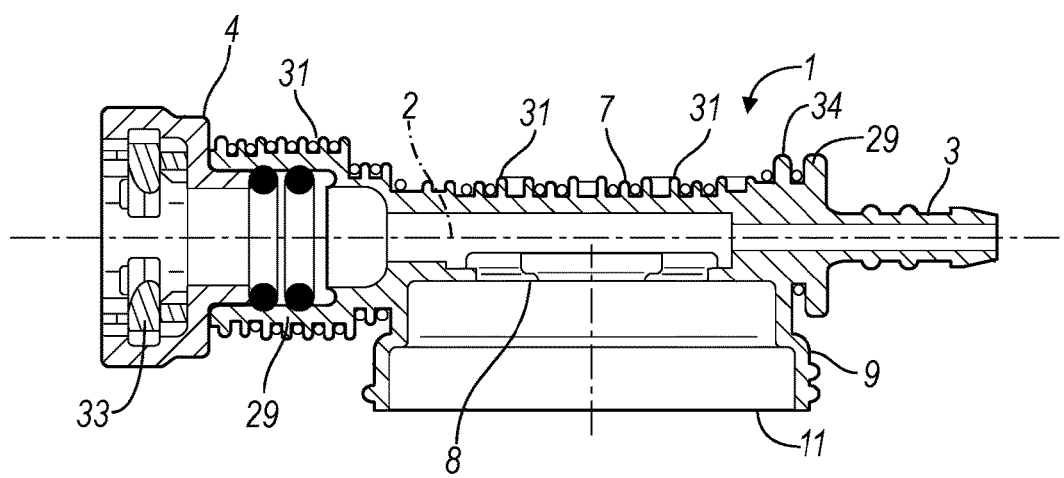
FIG. 4 is a longitudinal cross-section along cut line 4-4 in FIG. 2.

As is illustrated especially in FIGS. 1, 2 and 4, an electric heating unit 7 composed from the heating elements located there is disposed at the outside of the connecting piece 1 and serves for heating of the fluid flowing in the connecting piece 1, that is heating of the urea solution. In the depicted exemplary embodiment, the heating elements are composed of an electrically conducting wire 27. This conducting wire 27 extends in the region between the coupling sections 3, 4 on the outside of the connecting piece 1, in particular on the outside of the receiving housing 9, and specifically on the outside of the bottom section 28 of the receiving housing 9. Preferably the conductor wire 27 extends in a meander-like formation parallel to the bottom section 28; and in the region of the cylindrical sections 29 of the connecting piece 1 located between the bottom section 28 and the coupling sections 3, 4, the conductor wire 27 extends in a spiral shape winding around the perimeter of the cylindrical shaped sections 29. The free ends of the conductor wire 27 are guided in particular such that they can be connected electrically to external electrical power supply wires, for example, by clamping means. Likewise it is within the scope of the invention that the conductor wire 27 located on the connecting piece 1 is an extension of an electrical heating conductor 37, which is connected to a media line 6 joined to the line connector and/or to the connecting piece 1. The conducting wire 27 located on the connecting piece 1 can be circuited in series or in parallel with the electrical heating conductor 37 disposed on a connected media line 6, and specifically by means of a corresponding electric clamp connection or solder connection.

In addition, it can be an advantage according to the invention, when the electrical conductor wire 27 which is disposed on the connecting piece 1, is guided and secured along its progression on the connecting piece 1 by means of guide elements 31 which are designed as web-shaped or rib-shaped or even as guide grooves. This guiding and securing of the conductor wire 27 can also be provided only on sections.

Figure 7:
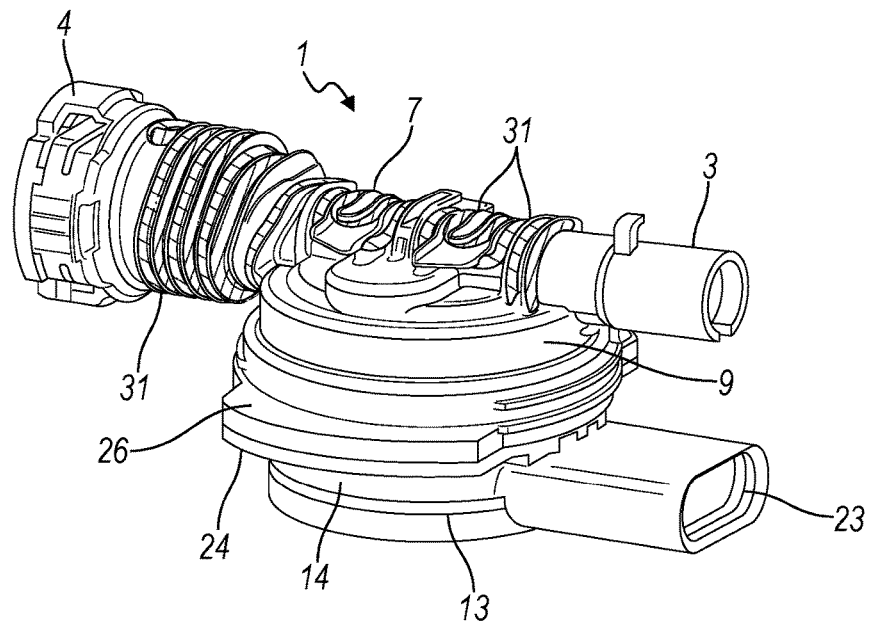
FIG. 7 is a perspective view of an additional embodiment of a line connector with attached sensor unit according to the invention.

FIG. 1 illustrates that one of the coupling sections, and specifically the coupling section 3 in the illustrated exemplary embodiment, is shaped as a coupling tenon onto which a flexible media line 6 is plugged, as is evident in FIG. 8. FIG. 7 depicts an alternative embodiment, and here the coupling section 3 is designed as a sleeve-like receiving element into which a media line 6, in particular a tube, can be inserted, and a firmly bonded connection is established between the inserted tube and the sleeve-like receiving element, for example, by means of laser welding.

Figure 10:
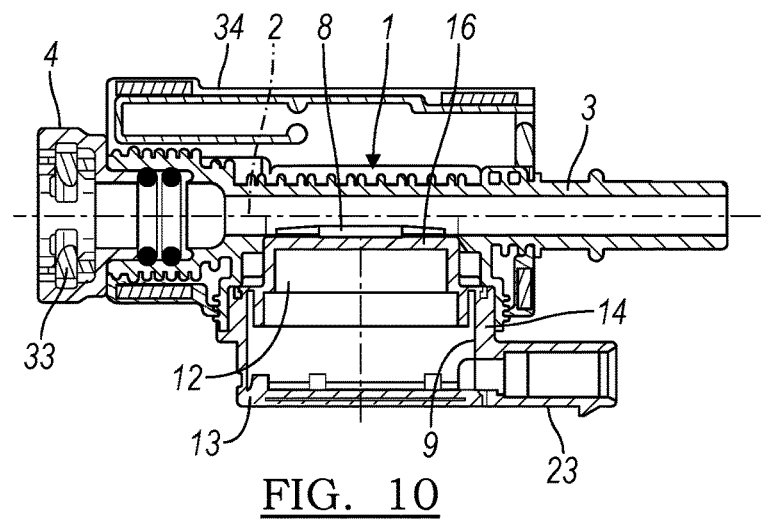
FIG. 10 is a longitudinal cross section through an additional design of a line connector according to the invention.

FIG. 10 illustrates an embodiment in which the coupling section 3 is designed as an SAE-coupler in the form of a tubular coupling piece onto which a media line 6 is plugged, and is secured for example with a clamp.

The coupling section 4 in the illustrated exemplary embodiments is represented as a sleeve section with release elements 33 formed thereon, so that an insertion element, for example a plug, can be inserted into and locked in this sleeve section, and thus secured by means of the release elements 33. In order to extract this insertion element again, the release elements 33 are actuated, for example, by spreading, and the insertion element can be withdrawn from the sleeve section.

Figure 9:
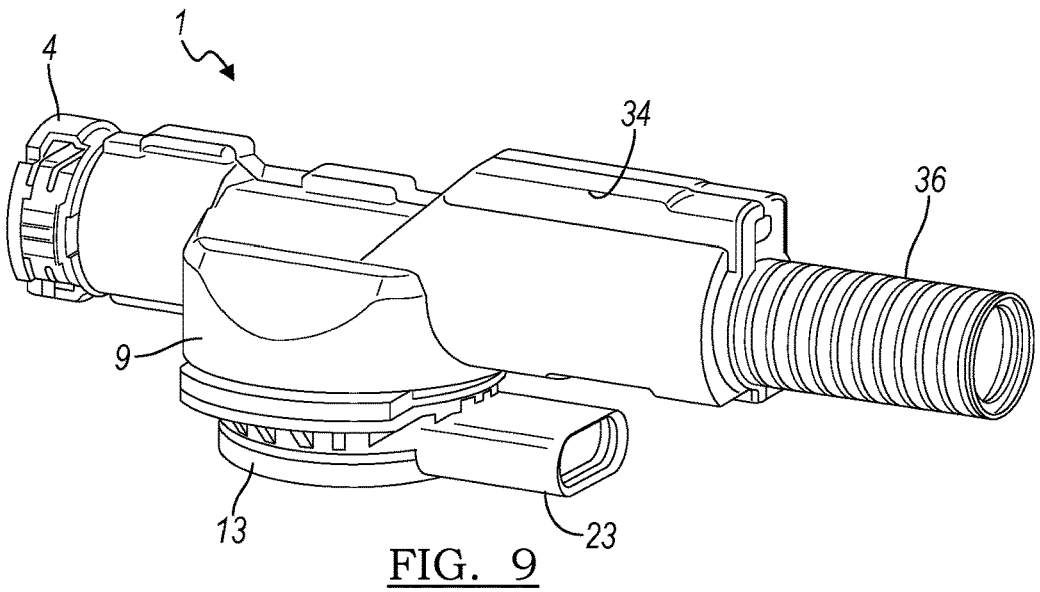
FIG. 9 is a perspective view of the line connector according to FIG. 8.

As is indicated in particular in FIGS. 8 and 9, it can be advantageous according to the invention, when the connecting piece 1 is surrounded by an encapsulation 34, especially of plastic, proceeding from the region between the coupling section 4 equipped with release elements 33, out to beyond the region or up to the opposing coupling section 3, and extending past this coupling section in the longitudinal direction. This kind of encapsulation, prevents any mechanical influence of the connecting piece 1 and of the heating elements 7 located thereon, and in addition, the radiation of heat to the outside is reduced. Furthermore, this housing can be designed such that it features a chamber to accommodate an electrical connector between the ends of the heating elements 7 located on the connecting piece 1 and the ends of electrical connectors introduced from the outside, and also any media line connected to ends of heating conductors. In one advantageous embodiment, this kind of encapsulation 34 can be formed from two housing halves so that one housing is produced, wherein the housing halves are joined together, in particular in a detachable manner, by means of snap-in fittings.

As is illustrated in FIG. 8, a line connector according to the invention can be a component part of a ready-made media line, so that the connecting piece 1 is connected, for example, in the region of its coupling section 3 to a media line 6 secured thereon. This media line 6 can be surrounded by an outer, tubular sheathing 36, wherein this can be in particular a corrugated tube. Preferably this tube is inserted by one end into the housing 34 and can be firmly bonded to the housing 34.

FIG. 10 depicts a so-called "stand-alone" variant of a line connector according to the invention. In this case the housing 34 extends between the exposed coupling section 4 and the transition of the coupling section 3 to the cylindrical-shaped section 29, so that the coupling section 3 is exposed, and is designed, for example, as an SAE coupling. The housing 34 features a chamber extending across the length of the heated region to accommodate the electrical connector wire and the electrical connections between the connector wires and the electrical conductors for heating of the connecting plug.

It remains within the scope of the invention to design the line connector according to the invention with coupling sections 3 on both sides, as described above. Also, the line connector according to the invention can be designed as an angled line connector.

The invention is not restricted to the illustrated and described exemplary embodiments, but rather encompasses also all equivalent designs within the sense of the invention. It is expressly emphasized that the exemplary embodiments are not restricted to all features in combination, rather each individual part feature can have inventive significance independently and detached from all other part features. Furthermore, the invention is not restricted to the combination of features defined in claim 1, but rather can also be defined by any other particular combination of specific features of all the disclosed individual features. This means that basically practically every individual feature of claim 1 can be omitted, and/or can be replaced by at least one other individual feature disclosed elsewhere in the application.

The invention claimed is:

1. A line connector for a fluid comprising:
a connecting piece with a flow-through channel in an interior thereof and extending in a longitudinal direction of the connecting piece, the connecting piece having two ends each with a coupling section configured such that a flexible media line or a tubing or an aggregate can be connected to an aggregate connector, the flow-through channel being provided with an electrical heating unit, in a region of the flow-through channel between the coupling sections a permeable wall section that is permeable to an optical sensor signal being formed in a wall of the connecting piece surrounding the flow-through channel as an open aperture, an enclosed perimeter receiving housing formed on the connecting piece and surrounding the permeable wall section, a covering received in the receiving housing and sealing off the aperture such that one wall section of the covering bounds the flow-through channel of the connecting piece, an optical sensor unit disposed in the receiving housing and configured to measure properties of a fluid flowing in the flow-through channel, the optical sensor unit including an emitter and an optical receiver arranged such that an optical beam path is guided from the emitter through the covering and the aperture to a medium flowing in the flow-through channel and is reflected by the medium back through the aperture and covering to the receiver.

2. A line connector according to claim 1, wherein the connecting piece is a single piece, integral plastic molded part including the receiving housing.

3. A line connector according to claim 1, wherein the connecting piece is formed of a plastic suitable for the transport of urea solutions used with SCR-catalysts.

4. A line connector according to claim 1, wherein the receiving housing defines a receiving opening is closed off by a sealing lid that is one of detachably or non-detachably connected to the receiving housing.

5. A line connector according to claim 4, wherein the sealing lid is detachable connected to the receiving housing by a bayonet connector.

6. A line connector according to claim 4, the sealing lid is non-detachable connected to the receiving housing by a permanently bonded laser welded connection.

7. A line connector according to claim 4, wherein the sealing lid defines an assembly space surrounded by a perimeter wall and the covering, the assembly space in the sealed position extending through the receiving opening of the receiving housing, wherein an optical sensor unit is mounted in the assembly space.

8. A line connector according to claim 4, further comprising a perimeter gasket arranged between the sealing lid and the receiving housing for sealing against leakage of fluid from the receiving housing.

9. A line connector according to claim 1, wherein the receiving opening is closed off by a sealing lid defining an assembly space that is sealed at a side facing the aperture by the covering, the sensor unit being enclosed by the covering in the assembly space.

10. A line connector according to claim 9, wherein on both sides of the one wall section bordering the flow-through channel the covering includes mutually opposing protrusions each featuring an inner cavity, wherein in one of the protrusions the emitter is arranged and in the other of the protrusions the optical receiver of the optical sensor unit is arranged, wherein the emitter and the receiver are further arranged such that an optical beam path is guided.

11. A line connector according to claim 10, wherein a recess is defined in a bottom section of the receiving housing on both sides of the aperture, each recess accommodating one of the protrusions.

12. A line connector according to claim 1, wherein a coupling region for an electrical power supply is formed in a region of the sealing lid.

13. A line connector according to claim 1, wherein the electrical heating unit is formed from heating elements disposed along an outside of the connecting piece.

14. A line connector according to claim 13, wherein the heating element is formed from at least one electrical conductor wire which meanders in the region of the connecting piece between the coupling sections on an outside of a bottom section of the receiving housing, on the outside of the wall of the flow-through channel, and in a region of cylindrical sections of the connecting piece, the conductor wire proceeding spiral-like between the bottom section and the coupling sections and two ends of the conductor wire are designed and disposed for coupling to separate electrical supply lines.

15. A line connector according to claim 14, wherein the electrical conductor wire is guided by guide elements in sections or over an entire progression to the connecting piece.

16. A line connector according to claim 14, wherein the coupling sections are designed as one of sleeve sections with detachment elements arranged thereon for detachable inserting of insertion elements, coupling elements for pushing on of a media line to be connected, or receiving elements for snap-on receiving of a media line to be connected and for permanent connection therewith.

17. A line connector according to claim 16, wherein the connecting piece is surrounded by an encapsulation in a region between the coupling section equipped with detachment elements, out to beyond a region or up to a region of the other coupling section.

18. A line connector according to claim 17, wherein the encapsulation is combined into one housing from two housing shells that are detachably joined together by means of snap-in features.

19. A line connector according to claim 17, wherein one of the encapsulation or the housing features a receiving chamber for receiving electrical connecting elements for connecting the ends of the conductor wire to electrical coupling wires of an external power supply or for connecting ends of a heating conductor of a media line connected thereto.

20. A ready-made media line, comprising a tubular media line and a line connector connected on one or both sides of the media line, wherein the line connector is according to claim 1.

21. A ready-made media line according to claim 20, wherein the tubular media line is surrounded by a mantle tube and the media line is spiral wrapped by a heating conductor along its longitudinal direction, wherein the mantle tube is introduced into one of encapsulation or the housing by a particular end inserted into encapsulation or into the housing, and the mantle tube is connected in a form fitted manner to one of the encapsulation or the housing, and also the heating wire of the media line is electrically connected to an external power supply via a connecting line or is connected to the conductor wire of the connecting piece by one of a series or parallel circuit.

\* \* \* \* \*